3,337,412
TOPICAL FLUORIDE-PHOSPHATE COMPOSITIONS
AND METHOD
Charles H. Elbreder, 14 Lynnbrook Drive,
Frontenac, Mo. 63124
No Drawing. Filed Apr. 10, 1964, Ser. No. 358,956
10 Claims. (Cl. 167—93)

This invention relates to therapeutic compositions and methods, and more particularly to compositions and methods useful for topical application to the teeth in the control and prevention of dental caries.

Broadly, the present invention is directed to water-soluble compositions for the preparation of gels useful in the control of dental caries and which have a pH between approximately 1.8 and 4.5 and a viscosity between approximately 7,000 and 100,000 centipoises, the compositions containing a fluoride compound which is soluble in water to provide a source of fluoride ions under acid conditions, an acid phosphate compound which is soluble in water to provide a source of phosphate ions and a gelling agent which is compatible with fluoride ions under acid conditions and stable throughout a pH range of approximately 1.8 to 4.5. The invention is also directed to gels and other viscous media prepared from such water-soluble compositions. The invention also concerns the method of forming such gel compositions and applying them to the teeth to effect takeup by the tooth enamel of fluoride from the compositions.

Among the objects of this invention may be noted the provision of water-soluble compositions for the preparation of gels, pastes or like viscous media useful in the treatment and control of dental caries; the provision of such water-soluble compositions from which useful gels, pastes or similar viscous media may be readily and conveniently prepared; the provision of compositions in gel or paste form which contain accurate, measured amounts of fluoride ions and phosphate ions and are adapted for topical application to teeth for the prevention of dental caries; the provision of compositions of the type described which have the necessary viscosity characteristics to permit the compositions to substantially adhere to a wax impression; the provision of compositions of this type which provide a source of fluoride ions and phosphate ions at a low pH value and which therefore permit greater takeup by tooth enamel of fluoride; and the provision of compositions of the type indicated which have no objectionable taste, cause no discoloration of teeth or gingival irritation and are readily stored and dispensed for use in the control and prevention of dental caries. Other objects and features will be in part apparent and in part pointed out hereinafter.

The invention accordingly comprises the products and methods hereinafter described, the scope of the invention being indicated in the following claims.

As is well recognized, topical application of fluoride solutions to the teeth is effective to reduce dental caries. Recent studies have shown that greater enamel incorporation of fluoride or greater takeup of fluoride by the tooth enamel occurs from acid phosphate-fluoride solutions than from stannous fluoride preparations at similar fluoride concentrations and pH. It is believed that the phosphate in acid phosphate-fluoride solutions apparently serves the dual purpose of reducing both the loss of enamel and the formation of calcium fluoride. Further, it is believed that the use of the acid phosphate-fluoride combination allows the use of low pH preparations without the danger of demineralization and with enhanced deposition of fluoride as fluoropatite rather than in the form of calcium fluoride.

As a result of the above noted studies, liquid acid phosphate-fluoride solutions have been clinically employed by dentists for topical application to teeth for the purpose of preventing or reducing dental caries. Clinical studies on school children, for example, have shown the caries-reducing effectiveness of a single application of liquid acid phosphate-fluoride preparations. In practice, the dentist makes a wax impression of the patient's teeth and then uses this as a mold in which the liquid acid phosphate-fluoride preparation is placed before applying the impression to the teeth to bring the preparation into intimate contact with the teeth. However, this practice has been found unsatisfactory in that the available liquid preparations tend to run out from between the interior of the wax impression and the teeth, particularly where the teeth in the lower jaw are being treated. Because of this, there is no assurance that the necessary intimate contact is achieved between the liquid preparation and all of the teeth. There has thus been an unfulfilled need for a stable, effective acid phosphate-fluoride preparation which avoids the shortcomings of presently available preparations.

In accordance with the present invention, it has now been found that the above shortcomings may be overcome through the use of an effective and improved composition for topical application having a pH between approximately 1.8 and 4.5 and a viscosity between approximately 7,000 and 100,000 centipoises, the composition containing water, a fluoride compound which is soluble in water to provide a source of fluoride ions, an acid phosphate compound which is soluble in water to provide a source of phosphate ions and a gelling agent which is compatible with fluoride ions under acid conditions and stable in a pH range of approximately 1.8 to 4.5. Preferably, the amount of fluoride compound included in the novel compositions of the invention is sufficient to provide 0.25 to 5.0% fluoride ions in solution under acid conditions, the amount of the acid phosphate compound included is sufficient to provide 0.5 to 4.5% of phosphate ions in solution, and the amount of gelling agent included is sufficient to impart to the composition a viscosity between 7,000 and 100,000 centipoises. By omitting water from the composition, a water-soluble, dehydrated composition or concentrate may be produced from which novel compositions having the viscosity and pH characteristics noted above, may be prepared.

The compositions of my invention having the stated viscosity and pH characteristics are in the form of gels, pastes or other viscous media which will adhere to a wax impression, even when inverted, and thereby permit intimate contact between the composition and the teeth throughout the period of desired topical treatment. Moreover, the compositions provide the accurate, measured quantities of fluoride ions and phosphate ions under the acid conditions which have been found most effective to give greater fluoride uptake by the tooth enamel. The compositions of the invention in gel form, for example, may be readily dispensed onto a wax impression from a plastic squeeze bottle, for example, and then the wax impression is applied to the teeth, or alternatively, the gel may be applied directly to the teeth with little, if any, runoff. Further, the compositions have no objectionable taste, and cause no discoloration of the teeth or gingival irritation.

The fluoride compound component of my novel compositions must be substantially soluble in water and ionize to provide a source of fluoride ions under acid conditions, i.e., at a pH of 1.8 to 4.5. Among the fluoride compounds of this character which have been found satisfactory for use in the practice of the invention may be mentioned sodium fluoride, potassium fluoride, ammonium fluoride, hydrofluoric acid, sodium bifluoride, potassium bifluoride, ammonium bifluoride and sodium silicofluoride. Other fluoride compounds including combined chemical compounds which yield fluoride ions in dilute aqueous solutions under acid conditions may also be utilized. The compositions of the invention contain a sufficient amount of such a fluoride compound to provide 0.25 to 5.0% of fluoride ions in the composition, preferably about 1.25%.

The acid phosphate compound component of my compositions must also be substantially water-soluble and not only provides the desired phosphate ions but also imparts the desired low pH value, i.e., between 1.8 and 4.5, to the composition. Examples of such acid phosphate compounds which may be used include orthophosphoric acid ($H_3PO_4$), monosodium phosphate ($NaH_2PO_4$), monopotassium phosphate ($KH_2PO_4$), disodium phosphate ($Na_2HPO_4$), dipotassium phosphate ($K_2HPO_4$), monoammonium phosphate ($NH_4H_2PO_4$), hemisodium phosphate ($NaH_2PO_4 \cdot H_3PO_4$), and carbamide phosphoric acid ($CO(NH_2)_2H_3PO_4$). It will be understood that other water soluble acid phosphate compounds of this character may also be used. Instead of an acid phosphate compound, a combination of a phosphate compound, such as trisodium phosphate ($Na_3PO_4$) or tripotassium phosphate ($K_3PO_4$) and an acid such as hydrofluoric acid, hydrochloric acid, sulfuric acid or acetic acid, may be used to form an acid phosphate compound such as orthophosphoric acid in situ. The amount of the acid phosphate compound included in the compositions of the invention is sufficient to provide approximately 0.5 to 4.5% of phosphate ions, preferably about 0.95%, and a pH of approximately 1.8 to 4.5, preferably about 3.0.

As to the gelling agent component of my compositions, such gelling agent must be substantially stable in a pH range of approximately 1.8 to 4.5, compatible with fluorides under such acid conditions (i.e., does not react with HF in solution), and impart to the composition a viscosity between approximately 7,000 and 100,000 centipoises, preferably about 44,000 centipoises. Gelling agents such as methyl cellulose, for example, which are hydrolyzed and break down under acid conditions are not suitable for use in the present invention since they do not exhibit the requisite stability. Among the gelling agents which have been found useful may be mentioned hydroxyethyl cellulose, carboxymethyl cellulose, magnesium aluminum silicate and silica aerogel. Also, a combination of a gelling agent such as polyvinyl alcohol and an activator such as a copolymer of methyl vinyl ether and maleic anhydride may be employed as the gelling agent in the practice of the invention. It will be understood that other gelling agents having the properties enumerated above may likewise be used in carrying out the invention. A sufficient quantity of the gelling agent is included in the compositions of the invention to impart thereto a viscosity within the range previously stated.

The following examples illustrate the invention.

Example 1

A composition in gel form was prepared having the following percentage by weight composition:

| Component: | Percent by weight |
|---|---|
| Sodium fluoride | 2.76 |
| Orthophosphoric acid | 1.00 |
| Hydroxyethyl cellulose | 2.50 |
| Distilled Water | 93.74 |
| | 100.00 |

In preparing the composition, the sodium fluoride and orthophosphoric acid were dissolved in the water and the hydroxyethyl cellulose gelling agent was then slowly added to the resulting solution with agitation until gelling occured. The resulting composition in gel form contained 1.25% of fluoride ions and 0.97% of phosphate ions, and had a pH of 3.0 and a viscosity of approximately 44,000 centipoises. This composition was found to be useful for topical application to teeth for the prevention or reduction of dental caries, by applying the composition to the teeth whereby it adheres to the teeth and maintaining the composition in contact with the teeth for a sufficient period of time to effect takeup by the tooth enamel of fluoride from the composition.

The water was removed from the above gel composition to give the following composition:

| Component: | Percent by weight |
|---|---|
| Sodium fluoride | 44.09 |
| Orthophosphoric acid | 15.97 |
| Hydroxyethyl cellulose | 39.94 |
| | 100.00 |

This dehydrated composition or concentrate was found to be readily soluble in water to form the original gel composition set forth above.

Example 2

Example 1 was repeated in preparing a gel composition having the following percentage by weight composition:

| Component: | Percent by weight |
|---|---|
| Potassium fluoride | 3.10 |
| Orthophosphoric acid | 1.00 |
| Hydroxyethyl cellulose | 3.00 |
| Distilled water | 92.90 |
| | 100.00 |

The resulting composition contained 1.1% of fluoride ions and 0.97% of phosphate ions, and had a pH of 3.0 and a viscosity of approximately 80,000 centipoises. A water-soluble concentrate may be prepared from this composition by removing the water or by omitting the use of water in the original preparation of the composition.

Example 3

Example 1 was repeated in preparing a gel composition having the following percentage by weight composition:

| Component: | Percent by weight |
|---|---|
| Ammonium fluoride | 1.95 |
| Orthophosphoric acid | 0.50 |
| Hydroxyethyl cellulose | 2.00 |
| Distilled water | 95.55 |
| | 100.00 |

The resulting composition contained 1.0% of fluoride ions and 0.49% of phosphate ions, and had a pH of 3.4 and a viscosity of 15,000 centipoises. A water-soluble concentrate is prepared from this composition as described above.

Example 4

Example 1 was repeated in preparing a gel composition having the following percentage by weight composition:

| Component: | Percent by weight |
|---|---|
| Sodium fluoride | 2.000 |
| Hydrofluoric acid (as HF) | 0.342 |
| Orthophosphoric acid | 0.980 |
| Hydroxyethyl cellulose | 2.500 |
| Distilled water | 94.178 |
| | 100.000 |

The resulting composition contained 1.23% of fluoride ions and 0.95% of phosphate ions, and had a pH of 3.0 and a viscosity of 44,000 centipoises.

Example 5

Example 1 was prepared in preparing a gel composition having the following percentage by weight composition:

| Component: | Percent by weight |
|---|---|
| Sodium fluoride | 2.000 |
| Hydrofluoric acid (as HF) | 0.342 |
| Orthophosphoric acid | 0.980 |
| Copolymer of methyl vinyl ether and maleic anhydride (marketed under the trade designation "Gantrez AN 169," by General Aniline & Film Corp.) | 3.000 |
| Polyvinyl alcohol (marketed under the trade designation "Elvanol 50–42," by E. I. du Pont) | 3.000 |
| Distilled water | 90.678 |
| | 100.000 |

The resulting composition contained 1.23% of fluoride ions and 0.95% of phosphate ions, and had a pH of 3.0 and a viscosity of 100,000 centipoises.

Example 6

Example 1 was repeated in preparing a gel composition having the following percentage by weight composition:

| Component: | Percent by weight |
|---|---|
| Sodium fluoride | 2.76 |
| Orthophosphoric acid | 1.00 |
| Copolymer of methyl vinyl ether and maleic anhydride (marketed under the trade designation "Gantrez AN 169,'" by General Aniline & Film Corp.) | 1.00 |
| Polyvinyl alcohol (marketed under the trade designation "Elvanol 50–42," by E. I. du Pont) | 1.00 |
| Distilled water | 94.24 |
| | 100.00 |

The resulting composition contained 1.25% of fluoride ions and 0.97% of phosphate ions, and had a pH of 3.1 and a viscosity of 7,000 centipoises. A water-soluble concentrate is prepared from this composition as described above.

Example 7

Example 1 was repeated in preparing a gel composition having the following percentage by weight composition:

| Component: | Percent by weight |
|---|---|
| Ammonium bifluoride | 1.50 |
| Orthophosphoric acid | 1.00 |
| Hydroxyethyl cellulose | 2.50 |
| Distilled water | 95.00 |
| | 100.00 |

The resulting composition contained 1.2% of fluoride ions and 0.97% of phosphate ions, and had a pH of 3.0 and a viscosity of 44,000 centipoises. A water-soluble concentrate is prepared from this composition as described above.

Example 8

Example 1 was repeated in preparing a gel composition having the following percentage by weight composition:

| Component: | Percent by weight |
|---|---|
| Sodium fluoride | 2.21 |
| Carbamide phosphoric acid | 6.64 |
| Carboxymethyl cellulose | 3.00 |
| Distilled water | 88.15 |
| | 100.00 |

The resulting composition contained 1.0% of fluoride ions and 4.0% of phosphate ions, and had a pH of 1.8 and a viscosity of 48,000 centipoises. A water-soluble concentrate is prepared from this composition as described above.

Example 9

Example 1 was repeated in preparing a gel composition having the following percentage by weight composition:

| Component: | Percent by weight |
|---|---|
| Sodium fluoride | 3.10 |
| Orthophosphoric acid | 2.58 |
| Magnesium aluminum silicate (marketed under the trade designation "Attagel 30," by Minerals & Chemicals Corp. of America) | 16.00 |
| Distilled water | 78.32 |
| | 100.00 |

The resulting composition contained 1.4% of fluoride ions and 2.5% of phosphate ions, and had a pH of 2.0 and a viscosity of 32,000 centipoises. A water-soluble concentrate is prepared from this composition as described above.

Example 10

Example 1 was repeated in preparing a gel composition having the following percentage by weight composition:

| Component: | Percent by weight |
|---|---|
| Sodium silicofluoride | 8.25 |
| Orthophosphoric acid | 4.12 |
| Silica aerogel (marketed under the trade designation "Santocel C," by Monsanto Company) | 3.50 |
| Distilled water | 84.13 |
| | 100.00 |

The resulting composition contained 5.0% of fluoride ions and 4.0% of fluoride ions, and had a pH of 1.5 and a viscosity of 8,000 centipoises. A water-soluble concentrate is prepared from this composition as described above.

Example 11

Example 1 was repeated in preparing a gel composition having the following percentage by weight composition:

| Component: | Percent by weight |
|---|---|
| Potassium bifluoride | 4.10 |
| Monosodium phosphate | 2.54 |
| Hydroxyethyl cellulose | 3.00 |
| Distilled water | 90.36 |
| | 100.00 |

The resulting composition contained 2.0% of fluoride ions and 2.0% of phosphate ions, and had a pH of 3.0 and a viscosity of 80,000 centipoises. A water-soluble concentrate is prepared from this composition as described above.

Example 12

Example 1 was repeated in preparing a gel composition having the following percentage by weight composition:

| Component: | Percent by weight |
|---|---|
| Sodium bifluoride | 2.45 |
| Hydrofluoric acid (as HF) | 1.59 |
| Trisodium phosphate | 3.05 |
| Hydroxyethyl cellulose | 2.75 |
| Distilled water | 90.16 |
| | 100.00 |

The resulting composition contained 3.0% of fluoride ions and 1.75% of phosphate ions, and had a pH of 3.0 and a viscosity of 65,000 centipoises.

Example 13

Example 1 was repeated in preparing a gel composition having the following percentage by weight composition:

| Component: | Percent by weight |
| --- | --- |
| Potassium bifluoride | 2.05 |
| Hydrofluoric acid (as HF) | 1.59 |
| Disodium phosphate | 2.98 |
| Hydroxyethyl cellulose | 2.25 |
| Distilled water | 91.13 |
| | 100.00 |

The resulting composition contained 2.5% of fluoride ions and 1.75% of phosphate ions, and had a pH of 2.2 and a viscosity of 35,000 centipoises.

In view of the above, it will be seen that the several objects of the invention are achieved and other advantageous results attained.

As various changes could be made in the above products and method without departing from the scope of the invention, it is intended that all matter contained in the above description shall be interpreted as illustrative and not in a limiting sense.

What is claimed is:

1. A composition useful for topical application in the control of dental caries comprising a fluoride compound which is soluble in water to provide a source of fluoride ions under acid conditions, said fluoride compound being present in an amount sufficient to provide 0.25 to 5.0% of fluoride ions, an acid phosphate compound which is soluble in water to provide a source of phosphate ions, said acid phosphate compound being present in an amount sufficient to provide 0.5 to 4.5% of phosphate ions and a pH between approximately 1.8 and 4.5, a gelling agent which is compatible with fluoride ions under acid conditions and stable in a pH range of approximately 1.8 to 4.5, said gelling agent being present in an amount sufficient to impart to said composition a viscosity between approximately 7,000 and 100,000 centipoises, and the balance water.

2. A composition useful for topical application in the control of dental caries comprising a water-soluble fluoride compound selected from the group consisting of sodium fluoride, potassium fluoride, ammonium fluoride, sodium bifluoride, potassium bifluoride, ammonium bifluoride and sodium silicofluoride, said fluoride compound being present in an amount sufficient to provide 0.25 to 5.0% of fluoride ions, an acid phosphate compound which is soluble in water to provide a source of phosphate ions, said acid phosphate compound being present in an amount sufficient to provide 0.5 to 4.5% of phosphate ions and a pH between approximately 1.8 to 4.5, a gelling agent which is compatible with fluoride ions under acid conditions and stable in a pH range of approximately 1.8 to 4.5, said gelling agent being present in an amount sufficient to impart to said composition a viscosity between approximately 7,000 and 100,000 centipoises, and the balance water.

3. A composition useful for topical application in the control of dental caries comprising a fluoride compound which is soluble in water to provide a source of fluoride ions under acid conditions, an acid phosphate compound which is soluble in water to provide a source of phosphate ions, said fluoride compound and acid phosphate compound being present in amounts sufficient to provide approximately 1.25% of fluoride ions, approximately 0.95% of phosphate ions and a pH of approximately 3.0, a gelling agent which is compatible with fluoride ions under acid conditions and stable at a pH of approximately 3.0, said gelling agent being present in an amount sufficient to impart to said composition a viscosity of approximately 44,000 centipoises, and the balance water.

4. A composition in gel form useful for topical application in the control of dental caries and having a pH of approximately 3.0 and a viscosity of approximately 44,000 centipoises comprising approximately 2.000% by weight of sodium fluoride, approximately 0.342% by weight of hydrofluoric acid (as HF), approximately 0.980% by weight of orthophosphoric acid, approximately 2.500% by weight of hydroxyethyl cellulose and the balance water.

5. A composition in gel form useful for topical application in the control of dental caries and having a pH of approximately 3.0 and a viscosity of approximately 44,000 centipoises comprising aproximately 2.76% by weight of sodium fluoride, approximately 1.00% by weight of orthophosphoric acid, approximately 2.50% by weight of hydroxyethyl cellulose and the balance water.

6. A water-soluble composition for the preparation of a gel composition, comprising a fluoride compound which is soluble in water to provide a source of fluoride ions under acid conditions, said fluoride compound being present in an amount sufficient to provide 0.25 to 5.0% of fluoride ions, an acid phosphate compound which is soluble in water to provide a source of phosphate ions, said acid phosphate compound being present in an amount sufficient to provide 0.5 to 4.5% of phosphate ions and a pH between approximately 1.8 and 4.5 and a gelling agent which is compatible with fluoride ions under acid conditions and stable in a pH range of approximately 1.8 to 4.5, said gelling agent being present in an amount sufficient to impart to said composition a viscosity between approximately 7,000 and 100,000 centipoises.

7. A water-soluble composition for the preparation of a gel composition, comprising a water-soluble fluoride compound selected from the group consisting of sodium fluoride, potassium fluoride, ammonium fluoride, sodium bifluoride, potassium bifluoride, ammonium bifluoride and sodium silicofluoride, said fluoride compound being present in an amount sufficient to provide 0.25% to 5.0% of fluoride ions, an acid phosphate compound which is soluble in water to provide a source of phosphate ions, said acid phosphate compound being present in an amount sufficient to provide 0.5% to 4.5% of phosphate ions and a pH between approximately 1.8 to 4.5, and a gelling agent which is compatible with fluoride ions under acid conditions and stable in a pH range of approximately 1.8 to 4.5, said gelling agent being present in an amount sufficient to impart to said composition a viscosity between approximately 7,000 and 100,000 centipoises.

8. A water-soluble composition for the preparation of a gel composition, comprising a fluoride compound which is soluble in water to provide a source of fluoride ions under acid conditions, an acid phosphate compound which is soluble in water to provide a source of phosphate ions, said fluoride compound and acid phosphate compound being present in amounts sufficient to provide approximately 1.25% of fluoride ions, approximately 0.95% of phosphate ions and a pH of approximately 3.0, and a gelling agent which is compatible with fluoride ions under acid conditions and stable at a pH of approximately 3.0, said gelling agent being present in an amount sufficient to impart to said composition a viscosity of approximately 44,000 centipoises.

9. A water-soluble composition for the preparation of a gel composition, comprising approximately 34.45% by weight of sodium fluoride, approximately 5.80% by weight of hydrofluoric acid (as HF), approximately 16.81% by weight of orthophosphoric acid and approximately 42.94% by weight of hydroxyethyl cellulose.

10. A water-soluble composition for the preparation of a gel composition, comprising approximately 44.09% by weight of sodium fluoride, approximately 15.97% by weight of orthophosphoric acid and approximately 39.94% of hydroxyethyl cellulose.

(References on following page)

References Cited

Dental Abstracts, vol. 8, p. 543, 1963, citing Pameijer et al., Arch. Oral Biol. 8: 183–185, March-April 1963.

Dental Abstracts, vol. 8, p. 555, 1963, citing Caldwell, J. California D.A. 38: 492, 524, December 1962.

Dental Abstracts, vol. 8, p. 759, 1963, citing Wellock et al., Arch. Oral Biol. 8: 179–182, March-April 1963.

LEWIS GOTTS, *Primary Examiner.*

R. L. HUFF, *Assistant Examiner.*